United States Patent [19]
Bond et al.

[11] 3,978,468
[45] Aug. 31, 1976

[54] INTERCOM CALL SIGNALING MECHANISM

[75] Inventors: Leland R. Bond; John W. Hymer; Robert F. Moore, all of Seattle, Wash.

[73] Assignees: Robert F. Moore; William B. Moore, both of Seattle, Wash.

[22] Filed: Nov. 11, 1974

[21] Appl. No.: 522,511

[52] U.S. Cl. .......................... 340/310 A; 340/310 R; 340/276
[51] Int. Cl.² ........................................ H04M 11/04
[58] Field of Search ........ 340/276, 274 R, 147 MD, 340/310 A, 310 R; 343/228; 179/2.5 R, 1 H, 2 F, 2.5 B, 1 B

[56] References Cited
UNITED STATES PATENTS

| | | | |
|---|---|---|---|
| 2,941,161 | 6/1960 | Scantlin | 343/228 UX |
| 3,069,657 | 12/1962 | Green | 343/228 X |
| 3,404,393 | 10/1968 | Blivice | 340/274 X |
| 3,656,143 | 4/1972 | Smith | 340/276 X |

*Primary Examiner*—Harold I. Pitts
*Attorney, Agent, or Firm*—Robert W. Beach

[57] ABSTRACT

The master unit of an intercom in a building includes a digital code selector operating a digital coder for transmission of remote unit identification code signals to the intercom receivers of several remote units for alerting persons at such respective units. Each remote unit includes a receiver for receiving both conversation transmission and an identification code signal, reference signal means and a signal comparator for comparing identification code signals received by its receiver with its reference identification code signal. Reception by a remote unit of the appropriate identification code signal conditions its receiver to produce an audible call or alerting signal from an electronic call signal received by the receiver of that remote unit from the transmitter of the master unit. The call signal is generated electronically and supplied to the transmitter of the master unit for transmission to all of the remote units. Both the conversation transmission and the indentification code signals are transmitted over the conventional electrical power wiring of the building.

6 Claims, 1 Drawing Figure

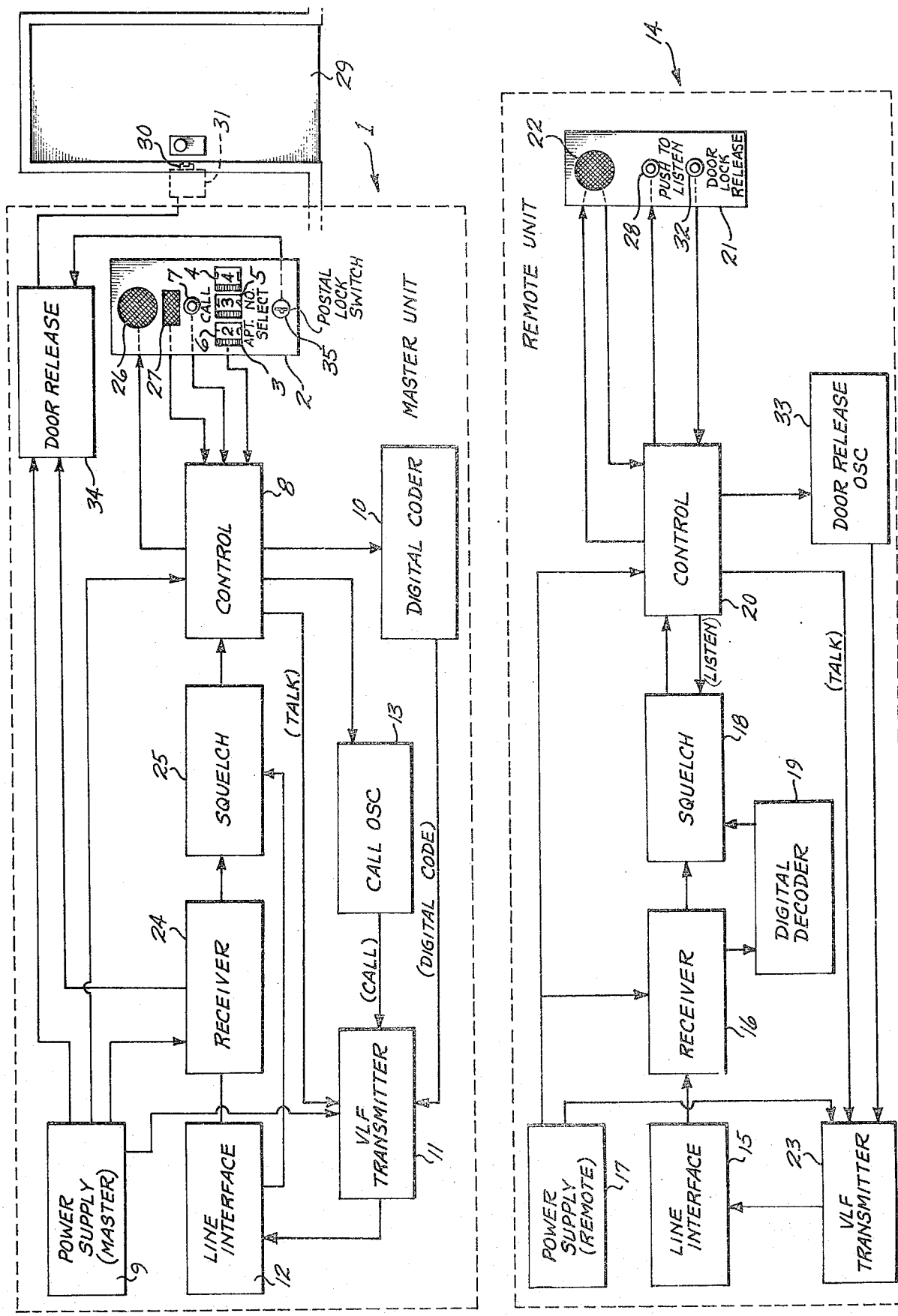

INTERCOM CALL SIGNALING MECHANISM

BACKGROUND OF THE INVENTION

1. Field of the Invention

This invention relates to mechanism for generating electronically a call signal transmitted by a master unit of an intercom, i.e. an intercommunication system, to several remote units of such system and utilizing such transmitted signal to produce an audible call or alerting signal at only a selected one of the remote units.

2. Prior Art

It is recognized that intercommunication systems have previously used the conventional electrical power wiring in a building for electrically connecting different units of the system for electric transmission of conversations. Such intercommunication systems have included a master unit and several remote units. Also intercommunication systems having wiring separate from the power wiring have included a call signal arrangement by which a call or alerting signal could be sent from the master unit to any one of a number of remote units, but in such systems separate call buttons have been provided at the master unit directly wired, respectively, to the several remote units. Such a system is disclosed in Blivice et al. U.S. Pat. No. 3,404,393, for example. It is understood, however, that in previous intercoms incorporating a master unit and several remote units utilizing the power wiring in a building there has not been a single call signal actuator at the master unit which could be operated to transmit a call signal to only one remote unit selected from several or from a considerable number of remote units without the necessity of having a call circuit from the master unit to each particular remote unit.

SUMMARY OF THE INVENTION

A principal object of the invention is to enable wiring common to a master unit and several remote units of an intercommunication system, such as the power wiring in a building, to be utilized for an intercom including a master unit and several remote units while enabling the operator of the master unit to signal at will only a selected one of the remote units.

More specifically, it is an object to provide a digital selector in the master unit of an intercom which will enable an operator to select a desired one of several remote units to alert for communication.

A further object of the invention is to provide mechanism associated with an intercom which will enable a door latch at the location of a master unit to be operated through the power wiring in a building by any one of several remote units. A related object is to enable such door latch mechanism to be released by means located in the vicinity of the master unit without a signal being received by the master unit from any remote unit.

It is also an object to provide an intercom including a master unit and several remote units having the capabilities stated above which is convenient and easy to operate.

Another object is to provide an intercom having the capabilities stated above which is comparatively economical to construct.

BRIEF DESCRIPTION OF THE DRAWING

The drawing illustrates diagrammatically the main circuit components of the master unit and the main circuit components of one of several remote units of the intercom, the units of the intercom being shown in block circuit diagram fashion because the transmitting and receiving circuitry and components are conventional.

DETAILED DESCRIPTION

The invention includes the provision of suitable circuitry for enabling the master unit of an intercommunication system to be operated so that an audible or alerting signal will be produced by a desired remote unit selected from several or a considerable number of remote units. In connection with the intercom, provision is also made for each of the remote units to be able to actuate the master unit door latch releasing mechanism, so that the intercom is particularly useful for announcing systems in apartment houses. A caller can use the master unit to select a remote unit in a particular apartment and call or alert the resident of the selected apartment. Such resident upon hearing the call or alerting signal can respond to and communicate with the person operating the master unit; and, if he desires such person to enter the building, the apartment occupant can actuate the door latch releasing mechanism so that the caller at the master unit can open the door and enter the apartment building.

The master unit 1 has an exposed operating panel 2 including a remote unit call selector 3. Such selector is operated so that an audible alerting signal will be produced in a desired one selected from a number of remote units. The selector is of the digital type and could enable any number of digits to be selected. The selector 3 illustrated in the drawing enables three digits to be selected, but it could provide for the selection of fewer or more digits. Conveniently, the digital code selected by the selector 3 will be the number of the apartment in the building. Preferably the digit selectors are of the rotary drum type, arranged to rotate about a common axis. The digit selectors illustrated include the unit selector 4, the tens selector 5 and the hundreds selector 6. The particular code indicated as being selected is 234.

The operating panel 2 also includes a signal actuator shown as the call push button 7 which can be pressed to close a momentary contact switch. The call signal selector 3 and the signal actuator 7 are connected to control circuitry 8. Such circuitry is powered by a master power supply 9. This power supply can be operated by the conventional 110-volt alternating current source of the building wiring and includes a transformer, a full-wave bridge rectifier and a voltage regulator to produce regulated direct current at a potential of plus or minus five volts and unregulated direct current at a potential of plus twelve volts.

The control circuitry 8 is connected to a digital coder 10 which produces an electronic code signal corresponding to the signal for which the rotary selector components of the signal selector 3 are set. The electronic digital code produced by the digital coder 10 is impressed on the very low frequency (VLF) transmitter 11 for transmission to all of the remote units of the intercom through a line interface 12, which is the power wiring of the building. The electronic digital code produced by the coder 10 for each digit is a compound pulse and the codes for the several digits are fed in series, corresponding to the digits of the selector 3 from left to right, from the coder to the transmitter 11. The transmitter may be of the frequency-modulation type and operate on a single frequency within the range of 30 to 300 kilohertz, a representative frequency being 83 kilohertz.

The control circuitry 8 is also connected to an oscillator 13 for generating an electronic alerting signal which will produce an audible signal, such as a beep, in a remote unit of the intercom. Such call oscillator is also connected to the transmitter 11 so that the transmitter will transmit the electronic call signal through the line interface 12 formed by the wiring of the building when the call push button 7 is pressed.

The great advantage of the present system is that it can include any reasonable number of remote units in association with a single master unit without requiring special direct wiring from the master unit to each remote unit. The master unit 1 having the selector elements 4, 5 and 6 could be used with 999 remote units. Such a master unit could be used with even a greater number of remote units by adding a fourth rotary drum selector. The remote unit 14 is therefore simply representative of at least several remote units. The line interface 12 of the master unit 1 is operatively connected to all of the line interface elements 15 of the remote units 14. The line interface operative connection may be the conventional power wiring circuitry of an apartment building.

The line interface 15 in each remote unit is connected to a receiver 16 which is powered by a power supply 17. This power supply in turn is powered by the same conventional 110-volt alternating current power source which powers the power supply 9 of the transmitter. Moreover its construction is similar to the power supply 9 of the master unit in making available regulated direct current at a potential of plus or minus 5 volts and unregulated direct current at a potential of 12 volts. The receiver is connected to a squelch circuit 18 under the control of the digital decoder 19. The digital decoder is effective to control the squelch circuit 18 so that signals can pass from the receiver 16 to the control 20 and on to the elements of the operating panel 21.

The digital decoder 19 will accumulate a code received by the receiver 16 which has been generated by the digital coder 10, determined by the setting of the signal selector 3 and transmitted by the transmitter 11 to the receiver. The decoder includes a signal comparator which compares the identification code signal received by the receiver with the reference identification code signal predetermined for the particular remote unit. If the signal impressed on the digital decoder by the receiver matches the predetermined reference identification code signal for that particular remote unit, the squelch circuit is disabled and the receiver is coupled through the control 20 to the output speaker 22 of the remote unit operating panel 21. When the call push button 7 of the master unit is pressed, therefore, the electronic call signal generated by the call oscillator 13 will be transmitted by the transmitter 11, received by the receiver 16 and converted by the receiver into an audio-frequency signal which will activate the speaker 22 to produce an audible call or alerting signal tone or beep.

A person, such as the resident of an apartment in which the remote unit is located, hearing the audible call alerting signal thus produced by the speaker 22 would then be aware of the desire of a person at the master unit to communicate. The remote unit 14 includes a transmitter 23 connected through the control 20 to the speaker 22, which speaker is of the type that will also function as a microphone. Alternatively, the transmitter 23 could be connected to a microphone of the operating panel 21 separate from the speaker 22. In either case the voice projected into the microphone will be converted into a radio frequency signal by the transmitter 23 and transmitted by the line interface 15 of the remote unit through the power wiring of the building to the line interface 12 of the master unit for reception by the receiver 24, which receiver converts the radio-frequency signal to an audio-frequency signal.

The receiver 24 is connected to a squelch circuit 25 that is also connected to the line interface 12. Radio-frequency signals impressed on the line interface disable such squelch circuit so as to enable such radio-frequency signals to be converted to audio-frequency signals by the receiver for transmission through the control 8 to an output speaker 26 on the operating panel 2. Because of the squelch circuit 25, the speaker 26 will be dead except when a radio-frequency voice signal is transmitted to the receiver 24 by the transmitter 23 of some remote unit 14. The radio-frequency signal transmitted to the line interface 12 will not only activate the receiver 24 but will disable the squelch circuit 25.

Upon receiving a voice message from the speaker 26, the person at the master unit can transmit a voice message through the microphone 27 on the master unit operating panel 2, which is connected to the transmitter 11 through the control circuitry 8. While in this instance the microphone 27 is shown as being separate from the speaker 26, a combined speaker and microphone device could be utilized for the master unit as described in connection with the remote unit speaker-microphone unit 22 if desired. The transmitter 11 will transmit the voice signal through the line interface unit the building power wiring 12 of the master unit, and the line interface unit 15 of the selected remote unit to the receiver 16, through the squelch circuit 18 and control 20 to the speaker 22.

Conventional switching means may be provided in either the master unit 1 or the remote unit 14, or both, to switch between "talk" and "listen" if desired. For example, operating panel 21 of the remote unit 14 is shown as having a push button 28 connected to the control circuit 20, which is to be pressed for enabling the speaker 22 to convert electronic audio-frequency signals to audible "talk" as distinguished from the initial call or alerting signal or beep. It is not necessary for the push button 28 to be pressed for the speaker 22 to convert audio-frequency signals into such an audible call signal. Also a conventional "talk" switch (not shown) may be provided to be closed manually to couple the microphone-speaker 22 to the VLF transmitter 23 for transmission of voice signals to the receiver 24 of the master unit 1.

Where the intercom is utilized in an apartment house with the master unit 1 being located outside the apartment house outside door 29 and the remote units being located in the respective apartments, it is desirable to associate with the voice communication system provision for enabling the apartment house door 29 to be unlatched by a person adjacent to a remote unit 14. It is recognized that remote-controlled devices for releasing a door latch 30 are not new in themselves, such mechanism being disclosed, for example, in U.S. Pat. No. 3,404,393 referred to above. The door latch is usually released by a solenoid device 31 for retracting the strike plate of the latch 30, which solenoid is ordinarily connected by separate individual branch lines extending directly to respective door solenoid operating push button switches at the respective remote units.

In the present invention door solenoid 31 is controlled by push button switch 32 of any remote unit 14. The push button switch is connected through the control circuit 20 to a door-release oscillator 33 of the remote unit. Such oscillator is connected to the transmitter 23 of the remote unit and will generate a signal which will be transmitted by the transmitter 23 through the line interface 15 of the remote unit and the line interface 12 of the master unit 1 to the receiver 24 of the master unit. Such receiver is connected not only to the speaker 26 of the operating panel 2, but also to the door latch release circuit 34, which in turn is connected to the latch-releasing solenoid device 31. When the push button 32 is pressed to close the door latch release switch, the audiofrequency signal generated by the oscillator 33 will be transmitted by transmitter 23 from the remote unit 14 to the receiver 24 of master unit 1 and actuate the door latch release circuit 34 to cause the door latch release solenoid 31 to retract the strike plate of latch 30 so that the door 29 can simply be swung open.

It may be desirable to be able to actuate the door latch release circuitry 34 from the operating panel 2 of the master unit 1, as well as by pressing the push button switch 32 from a remote unit 14. It may be desirable for such local activation of the door latch release circuitry to be accomplished by the owner of the apartment building, or by maintenance personnel, or by the postman, for example. For such purpose a key-operated switch 35, designated the "postal lock switch", is provided on the operating panel 2 of the master unit 1.

Such switch is connected to the door latch release circuitry 24 in parallel with the connection from the receiver 24 to the door latch release circuitry 34. Since the door latch release circuitry is connected to the power supply 9 independently of the receiver 24, the door latch release circuitry can be operated by closing of switch 35 to energize the solenoid device 31 for releasing latch 30, even through the receiver 24 is inactive and all remote unit switches 32 are in the open circuit position.

We claim:

1. In a signaling and communication system for a building including a master station and a plurality of remote stations, the combination of
    electric power wiring extending throughout the building,
    a master station unit at the master station and having
        a transmitter connected to said power wiring for transmission thereover,
            alerting signal mechanism connected to actuate said master unit transmitter and including
                digital code selector means for selecting different predetermined electronic digital codes corresponding respectively to the several remote stations and
                digital coder means controlled by said digital code selector means for producing signals corresponding to the selected ones of such predetermined electronic digital codes,
            voice-actuated mechanism connected to said master unit transmitter,
        a receiver connected to said power wiring for receiving transmission thereover,
        a speaker operable by said master unit receiver,
    a plurality of remote station units each having
        a receiver connected to said power wiring for receiving transmission thereover,
            speaker means operable by said remote unit receiver,
                means for activating said remote unit speaker means to produce an audible alerting signal only in response to reception by its receiver of a signal corresponding to the predetermined electronic digital code signal generated by said master unit digital coder means corresponding to the particular remote station of said receiver,
                means for activating said remote unit speaker means to produce voice sounds in response to reception by the remote unit receiver of signals generated by said master unit voice-actuated mechanism and transmitted by said master unit transmitter over said power wiring, and
        a remote station unit transmitter connected to said power wiring for transmitting conversations thereover to said master station unit receiver.

2. In the system defined in claim 1, an electronic audible alerting signal generator connected to the digital coder means of the master station unit for producing the electronic digital code signals to be transmitted by the master station unit transmitter over the power wiring to the receivers of the remote station units for production of an audible alerting sound by a selected remote station unit.

3. In the system defined in claim 1, the digital code selector means enabling a code corresponding to plural digits to be selected, and the digital coder means producing sequential electronic digital code signals corresponding, respectively, to the particular plural digits selected by operation of the digital code selector means.

4. In the system defined in claim 1, each remote station unit including digital decoder means including reference identification code signal means and comparator means for comparing the signal of said reference identification code signal means with the identification digital code signal produced by the digital coder means, transmitted to the remote unit over the power wiring and decoded by said digital decoder means of that remote station unit.

5. In the system defined in claim 1, each remote station unit including door-release actuating mechanism connected to the transmitter of such remote station unit and operable to produce a distinctive door-releasing electronic signal for transmission by such transmitter over the power wiring, the master station unit receiver being operable to receive door-releasing signals from the remote station unit transmitters, and the master station unit further including door-releasing mechanism connected to the master station unit receiver and operable in response to a door-releasing electronic signal received by such receiver to release a door latch.

6. In the system defined in claim 5, door latch control means connected to the door-releasing mechanism independently of the receiver of the master station unit for effecting door-releasing operation of the door-releasing mechanism independently of a door-releasing electronic signal received by the receiver of the master station unit from a transmitter of a remote station unit.

* * * * *